Aug. 6, 1935.   J. L. DRAKE   2,010,064
FURNACE CONSTRUCTION AND PROCESS OF PRODUCING MOLTEN GLASS
Filed May 29, 1933
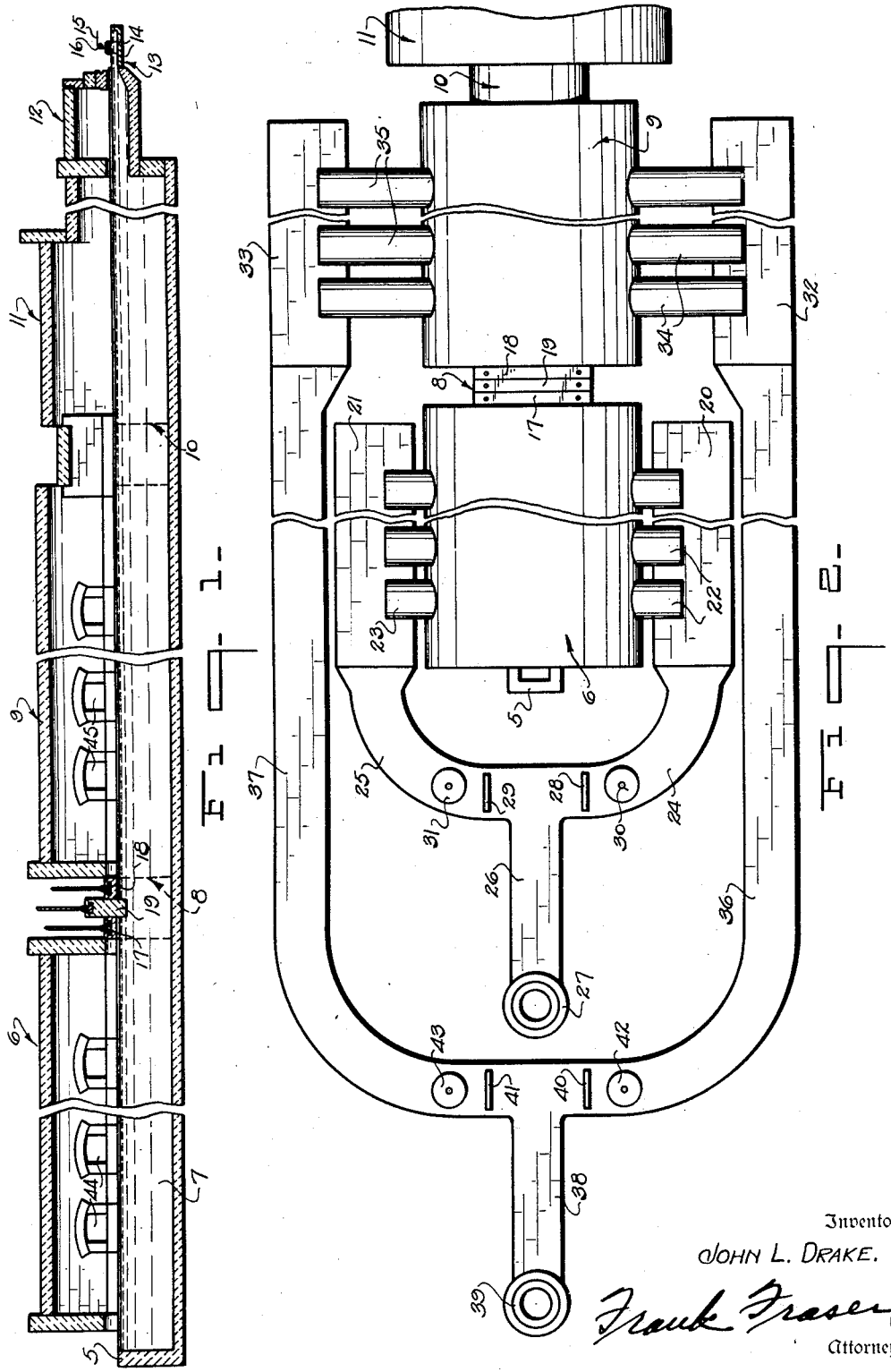
Inventor
JOHN L. DRAKE.
Frank Fraser
Attorney Patented Aug. 6, 1935

2,010,064

UNITED STATES PATENT OFFICE 2,010,064

FURNACE CONSTRUCTION AND PROCESS OF PRODUCING MOLTEN GLASS

John L. Drake, Toledo, Ohio, assignor to Libbey-Owens-Ford Glass Company, Toledo, Ohio, a corporation of Ohio Application May 29, 1933, Serial No. 673,346

8 Claims. (Cl. 49—54)

The present invention relates broadly to the art of glass manufacture and more particularly to a novel and improved furnace construction and process of producing molten glass.

In the manufacture of continuous sheet glass, either by a "drawing" or a "rolling" operation, it is customary to melt the raw batch ingredients in one end of a relatively long tank furnace and cause the molten glass to flow slowly through the refining and cooling portions or chambers thereof into a working receptacle from which the glass is drawn or otherwise removed in the form of a continuous sheet or ribbon.

The glass batch usually contains certain alkaline constituents such as, for example, soda ash and salt cake, and it has been found that these alkalies have an injurious effect upon the refractory clay blocks of which the furnace is constructed in that they cause corrosion and wearing away thereof. And this is especially true before the alkalies enter into solution. In other words, the free alkalies attack the tank blocks, the rate of attack varying directly with the temperature; that is, the higher the temperature, the more rapid the attack. After these alkalies enter into combination with the sand and other ingredients, however, their attack on the tank blocks is materially lessened.

When making continuous sheet glass and especially by a rolling operation, a relatively high melting temperature is desirable and in fact necessary in order to produce molten glass which is free from seeds and because of this high temperature, the life of the tank blocks is very limited. That is to say, in order to produce molten glass which is free from seeds, a relatively high melting temperature has to be maintained and as a consequence, the free alkalies have a very destructive action upon the tank blocks before they enter into combination with the sand and other ingredients. On the other hand, a reduction in the melting temperature, while prolonging the life of the tank blocks, would result in a glass containing a great number of seeds.

The aim of this invention, therefore, resides in the provision of a new and efficient furnace construction and process of producing molten glass whereby it is possible to retain the advantage of high temperature in its relation to making seed free glass and at the same time increase the life of the furnace.

Briefly stated, according to the present invention, the melting end of the furnace is sub-divided to provide a melting tank or chamber and a superheating tank or chamber communicating with one another, preferably, though not necessarily, by means of a restricted passageway or neck. The glass batch is introduced into the melting tank in any well known or preferred manner and subjected therein to a relatively low melting temperature and preferably to as low a temperature as is possible to effect substantially complete solution of the raw materials. The molten glass produced is then caused to flow into the superheating tank where it is subjected to a relatively higher temperature which is sufficient to clear it of seeds. After superheating, the molten glass passes through the refining and cooling chambers of the furnace into the working receptacle. By utilizing a relatively low melting temperature until the alkaline constituents (soda ash and salt cake) have entered into combination with the sand and other ingredients, their attack upon the tank blocks will be reduced to a minimum. On the other hand, after the batch has been melted, the temperature can be increased to reheat the glass and thus free it of seeds without materially affecting the tank blocks since, as pointed out above, after the alkalies enter into solution in the glass, their attack on the tank blocks is greatly lessened.

Other objects and advantages of this invention will become more apparent during the course of the following description when taken in connection with the accompanying drawing.

In the drawing wherein like numerals are employed to designate like parts throughout the same, Fig. 1 is a vertical longitudinal section through a continuous tank furnace constructed in accordance with the present invention, and Fig. 2 is a plan view of the melting end of the furnace.

In the continuous tank furnace provided by the present invention, the glass producing materials or batch are introduced into the furnace at one end thereof through a so-called dog-house 5 and melted in the substantially rectangular melting tank 6 to form a mass or body of molten glass 7. The molten glass then flows slowly toward the right through a restricted passageway or neck 8 into a substantially rectangular superheating tank 9 wherein the glass is adapted to be subjected to a relatively higher temperature than is employed in the melting tank 6. The molten glass flows slowly from the superheating tank through a reduced passageway or neck 10 into the refining chamber 11 and thence through a relatively shallower cooling chamber 12 into the working receptacle or draw-pot 13. The various portions of the furnace referred to above are arranged in substantial horizontal alignment with one another so that the molten glass is caused to flow continuously from the melting tank 6 through the furnace and into the working receptacle 13 in a substantially straight unbroken path.

Any desired type of sheet forming machine or mechanism may be associated with the working receptacle 13 to withdraw the molten glass therefrom in the form of a continuous sheet or ribbon. That is to say, the continuous sheet of glass may be produced by either a "drawing" or a "rolling" operation. As illustrated in the drawing, by way of example, however, the glass sheet is produced by a rolling operation. Thus, there is positioned above the working receptacle 13 a pair of forming rolls 14 which are adapted to draw a relatively heavy body of glass upwardly and roll it to a sheet 15 of substantially predetermined and uniform thickness. The sheet passes upwardly from the forming rolls for a relatively short distance and is then deflected into the horizontal plane about a rotatable bending roll 16 and carried horizontally into and through an annealing lear (not shown). As is well known in the art, the continuous sheet or ribbon of glass emerges from the exit end of the annealing leer onto a so-called capping table upon which it is cut transversely into sections of the desired length.

The roof or cap for the neck 8 consists of a pair of substantially flat horizontally arranged refractory cover members 17 and 18 between which is disposed a bridge wall 19, said members and bridge wall being vertically adjustable in any desired manner. The members 17 and 18 are preferably positioned relatively close to the surface of the mass of molten glass, while the bridge wall 19 is slightly immersed therein as shown in Fig. 1. The suspended bridge wall is removable so that it can be removed for repair or replacement as well as vertically adjustable to compensate for wear. This bridge wall effectively separates the heat in the melting tank 6 from the heat in the superheating tank 9 whereby to prevent the heated atmosphere in the former from passing into and mixing with the heated atmosphere in the latter and vice-versa, to the end that the fire in either tank can be run to best suit conditions in that particular tank without having any detrimental effect upon the glass in the other tank.

This invention also contemplates the provision of independent regenerative heating systems for the melting and superheating tanks 6 and 9 respectively so that these two tanks can be heated entirely independently of one another. Thus, there is arranged at opposite sides of the melting tank 6 the regenerators 20 and 21 in communication with the tank ports 44 through the uptakes 22 and 23 respectively. Connected to and leading from one end of the regenerators 20 and 21 are the conduits 24 and 25 respectively which communicate at their outer ends with a flue 26 leading to the stack 27, the communication between the said conduits 24 and 25 and flue 26 being controlled by dampers 28 and 29. The conduits 24 and 25 are also provided inwardly of but adjacent dampers 28 and 29 with the air intake valves 30 and 31 respectively which control the amount of air entering said conduits.

In the heating of melting tank 6, the gas flames are adapted to be introduced into the tank first from one side and then from the opposite side thereof, the firing operation being reversed periodically, for example every twenty minutes. Thus, assuming that the regenerator 20 is in operation so that the flame will enter the tank from this side, pass across the same, and exhaust through regenerator 21, the damper 28 is closed, air intake valve 30 opened, damper 29 opened, and air intake valve 31 closed. The air will then enter through the air intake valve 30, pass upwardly through the regenerator 20 and uptakes 22 to the ports 44 where it will be mixed with the gas in the usual manner. The products of combustion exhausting through the uptakes 23 at the opposite side of the tank will pass outwardly through the regenerator 21, conduit 25, and flue 26 to the stack. When the firing of the tank is reversed, the air intake valve 30 is closed, damper 28 opened, damper 29 closed, and air intake valve 31 opened. The air will then pass to the tank through the regenerator 21 and exit through regenerator 20.

The regenerative heating system for the superheating tank 9 is of substantially the same construction and operation as that described above for the melting tank 6. Thus, there are arranged at opposite sides of the superheating tank the regenerators 32 and 33 connected with the ports 45 through the uptakes 34 and 35 respectively. Leading from the regenerators 32 and 33 are the conduits 36 and 37 respectively communicating at their outer ends with a flue 38 leading to the stack 39. Arranged within the conduits 36 and 37, adjacent flue 38, are the control dampers 40 and 41 respectively, while arranged inwardly of but adjacent said dampers are the air intake valves 42 and 43 respectively. When the superheating tank is being fired through the regenerator 32, the air intake valve 42 is opened, damper 40 closed, damper 41 opened, and air intake valve 43 closed, whereas when the tank is being fired from the opposite side, the air intake valve 42 is closed, damper 40 opened, damper 41 closed, and air intake valve 43 opened.

In producing molten glass in the furnace above described, the raw batch ingredients are introduced into the melting tank 6 through the doghouse 5 and melted therein to produce the mass of molten glass 7. During melting, the glass batch is subjected to a relatively low temperature and preferably to as low a temperature as is possible to cause substantially complete solution of the raw materials. This is desirable since, as pointed out above, until the alkaline constituents (soda ash and salt cake) enter into combination with the sand and other ingredients, they attack the tank blocks causing corrosion and wearing away thereof. And especially is this true when a high melting temperature is employed; the higher the melting temperature, the more rapid the attack. The molten glass produced in the melting tank flows therefrom through the neck 8 into the superheating tank 9 and the size of the melting tank and rate of withdrawal of the glass from the working receptacle are so proportioned that by the time the glass passes into the superheating tank, all of the ingredients will be in substantially complete solution. As the molten glass flows slowly through the superheating tank, it is subjected to a relatively higher temperature than that employed in the melting tank, the purpose of this higher temperature being to release the seeds from the glass. Seeds are simply small bubbles present in the body of glass and which, when the glass is subjected to a relatively high temperature, pass upwardly therethrough and break upon reaching the surface. The superheating of the glass in this manner not only results in the making of seed free glass, but at the same time prolongs the life of the furnace since during reheating, the batch ingredients are in substantially complete solution so that their attack on the tank blocks is materially less. The molten glass then flows through the refining chamber 11, where it is further refined, through the cooling chamber 12, and into the working receptacle 13 from which it is drawn or otherwise removed in continuous sheet form. Although the invention is obviously not restricted to the use of any specific temperatures in the melting and superheating tanks, yet it may be set forth, by way of example, however, that a temperature of 2700 degrees Fahrenheit may be maintained in the melting tank 6 and a temperature of 2800 degrees Fahrenheit in the superheating tank 9.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing molten glass consisting in first subjecting the glass batch to a relatively low temperature until the ingredients are in substantially complete solution, then subjecting the molten glass to a relatively higher temperature to effect the release of seeds therefrom, and in then cooling the glass.

2. The process of producing molten glass consisting in first melting the glass batch ingredients at a relatively low temperature to cause substantially complete combination thereof, then heating the molten glass to a relatively higher temperature to effect the release of seeds therefrom, and in then successively refining and cooling the glass.

3. The process of producing molten glass consisting in first melting the glass batch at a relatively low temperature to form a pool of molten glass, then superheating the glass to raise the temperature thereof to a point above the melting temperature to effect the release of seeds therefrom, and in then cooling the glass.

4. The process of producing molten glass consisting in first melting the glass batch at a relatively low temperature to form a pool of molten glass, flowing the molten glass from said pool into a second pool, then superheating the glass in said second pool to a temperature which is relatively higher than the melting temperature to effect the release of seeds therefrom, and in then cooling the glass.

5. The process of producing molten glass consisting in first subjecting the glass batch to a relatively low temperature until the ingredients are in substantially complete solution, causing the molten glass produced to flow in a substantially straight unbroken path successively through a superheating zone and cooling zone into a working zone, and in subjecting the molten glass as it flows through said superheating zone to a temperature which is relatively higher than the melting temperature to effect the release of seeds therefrom.

6. The process of producing molten glass consisting in first melting the glass batch ingredients at a relatively low temperature to cause substantially complete combination thereof, causing the molten glass to flow continuously through a superheating zone, refining zone, and cooling zone into a working receptacle, and in heating the glass as it flows through said superheating zone to raise the temperature thereof to a point above the melting temperature to effect the release of seeds therefrom.

7. The process of producing molten glass consisting in first melting the glass batch at a relatively low temperature in the melting end of a continuous tank furnace to form a pool of molten glass, in setting up a continuous flow of the molten glass from said melting end through the superheating and cooling zones of the furnace into a working zone, and in heating the glass to a relatively higher temperature as it flows through said superheating zone to effect the release of seeds therefrom.

8. The process of producing molten glass consisting in first melting the glass batch at a relatively low temperature in the melting end of a continuous tank furnace to form a pool of molten glass, in setting up a continuous flow of the molten glass from said melting end through the superheating refining, and cooling zones of the furnace into a working zone, and in heating the glass within the superheating zone to raise the temperature thereof to a point above the melting temperature to effect the release of seeds therefrom.

JOHN L. DRAKE.